United States Patent [19]

McAndrews

[11] Patent Number: 5,160,851
[45] Date of Patent: Nov. 3, 1992

[54] RECHARGEABLE BACK-UP BATTERY SYSTEM INCLUDING A NUMBER OF BATTERY CELLS HAVING FLOAT VOLTAGE EXCEEDING MAXIMUM LOAD VOLTAGE

[75] Inventor: Joseph M. McAndrews, Freeport, N.Y.

[73] Assignee: Nynex Corporation, New York, N.Y.

[21] Appl. No.: 573,994

[22] Filed: Aug. 28, 1990

[51] Int. Cl.$^5$ .............................. H02J 7/00; H02J 9/06
[52] U.S. Cl. ...................................... 307/66; 307/46; 379/413
[58] Field of Search .................................. 307/44–46, 307/48, 64–66, 82, 86, 87; 320/5, 6, 13; 379/413

[56] References Cited

U.S. PATENT DOCUMENTS

| | | | |
|---|---|---|---|
| 1,343,597 | 6/1920 | Turbayne | 320/8 |
| 1,931,867 | 10/1933 | Holder et al. | 307/66 |
| 2,062,274 | 11/1936 | Rees | 307/64 |
| 2,316,331 | 4/1943 | Hedding | 307/46 |
| 2,334,528 | 11/1943 | Amsden | 307/64 |
| 2,398,845 | 4/1946 | Mullerheim | 379/413 |
| 2,653,252 | 9/1953 | Ostendorf, Jr. | 307/64 |
| 2,675,490 | 4/1954 | Portail | 307/48 |
| 3,505,531 | 4/1970 | Wattson | 307/64 |
| 3,594,628 | 7/1971 | Gutzmer | 320/13 |
| 4,096,394 | 6/1978 | Ullmann et al. | 307/64 |
| 4,220,872 | 9/1980 | Fahey | 307/66 |
| 4,670,661 | 6/1987 | Ishikawa | 307/66 |
| 4,675,538 | 6/1987 | Epstein | 307/64 |
| 4,760,322 | 7/1988 | Crampton | 307/66 |

Primary Examiner—A. D. Pellinen
Assistant Examiner—Richard T. Elms
Attorney, Agent, or Firm—Loren Swingle; John T. Torrente

[57] ABSTRACT

A back-up battery system for a switching equipment load in a telephone central office wherein the back-up battery system includes one or more rechargeable batteries having cells floated at a given float voltage and of a number such that when the batteries are switched in circuit across the load, the voltage of the batteries exceeds a minimum load voltage for a preselected period, and further being of a number such that the float voltage of the batteries exceeds a maximum load voltage.

28 Claims, 2 Drawing Sheets

RECHARGEABLE BACK-UP BATTERY SYSTEM INCLUDING A NUMBER OF BATTERY CELLS HAVING FLOAT VOLTAGE EXCEEDING MAXIMUM LOAD VOLTAGE

BACKGROUND OF THE INVENTION

This invention relates to back-up battery systems and, in particular, to back-up battery systems adapted for use in telephone plants or central offices.

In telephone plants, commercial AC power is used as a source of supply for rectifiers which convert the AC power to DC power for application to the switching equipment used in the plant. If there should occur an interruption or failure in the AC power, this will result in a corresponding failure in the converted DC power. Failure of the DC power, in turn, will result in failure of the switching equipment and an outage in telephone service.

In order to avoid such service outages, telephone plants usually employ back-up battery systems which are brought into service upon failure or interruption of the commercial AC power and/or converted DC power. Present day back-up battery systems typically comprise one or more rechargeable or secondary batteries which are permanently wired in parallel with the switching equipment or load. These batteries are designed to provide the necessary DC power to the load for a selected period of time within which the failure or interruption in primary power is expected to be restored. These batteries also serve as a low resistance path to ground during normal service, so as to prevent small load variations from affecting the supply of power.

Due to the characteristics of the switching equipment, the converted DC power supplied to the equipment must be maintained below a maximum voltage value and above a minimum voltage value. As a result, the voltage of the rechargeable secondary batteries in the back-up system must be maintained between these voltage values over the expected period of operation of the back-up system. Furthermore, it is also desired that the rechargeable batteries be floated at a voltage which is designed to maintain the float voltage of the individual cells of the battery at predetermined value considered necessary for extended battery life.

In a representative present day telephone plant, the switching equipment or load might draw a DC current of about 1150-1200 amps at a nominal or preselected DC negative load voltage of about −52 volts. The maximum and minimum negative voltage values sustainable by such a representative load, in turn, might be approximately −55 volts and −45 volts, respectively. For a load of this type, the standard back-up battery system might typically comprise four parallel rechargeable batteries each at a floated DC negative voltage of −52 volts and each capable of providing a current of 300 amps to the load. Each rechargeable battery, in turn, would then comprise 24 series connected standard battery cells in order to achieve a floated DC negative voltage per cell of approximately −2.17 volts, which is presently considered the most beneficial for extended battery life.

As is also known, such standard battery cells have a voltage characteristic which decreases sharply to an initial minimum value shortly after the cell is brought into operation. The voltage characteristic then increases to a plateau voltage and thereafter again decreases, this time gradually, over time.

Thus, in the above-mentioned representative back-up battery system the negative voltage of each cell of each battery string decreases to −1.93 volts within about 1½ minutes of operation, then increases to a plateau voltage value of approximately −1.97 to −1.98 volts over the next 10-15 minutes of operation and thereafter decreases to −1.88 volts over the next 2 hours and 45 minutes. Accordingly, the 24 cells of secondary batteries, each start with an initial negative voltage of −52 volts, decrease in negative voltage to approximately −46 volts, then increase in negative voltage to approximately −48 volts and then again decrease in voltage to approximately −45 volts over a three hour period. The secondary batteries, therefore, stay within the required minimum and maximum load voltage requirements over a three hour back-up period, while combining to provide the current load requirement.

Back-up systems using the aforesaid standard cell 24 rechargeable batteries have worked successfully over many years. However, because of the aging of the switching equipment, there is a concern as to whether the standard system can continue to meet the minimum load voltage requirement which is believed to be increasing in value with time. Thus, in the representative system discussed above, instead of the switching equipment requiring a minimum negative voltage value of −45 volts, the aging of the equipment may increase the requirement to approximately −46 volts. Under these circumstances, the use of the aforesaid 24 cell back-up battery system may no longer accommodate the load requirements, due to the initial decrease or dip in voltage which, as above-indicated, decreases the negative battery voltage to close to −46 volts.

While simply increasing the voltage of each battery by one or two cells would appear to solve this problem, doing so also increases the float voltage requirements of the batteries, if the −2.17 volts per cell float standard is to be satisfied. Since the increased float voltage may exceed the maximum load voltage requirement, this simple modification is not a satisfactory solution to the problem.

It is, therefore, an object of the present invention to provide an apparatus and method for realizing an improved back-up battery system for the switching equipment in a telephone plant.

It is a further object of the present invention to provide a back-up battery system which is adapted to accommodate for the aging of the aforesaid switching equipment.

SUMMARY OF THE INVENTION

In accordance with the principles of the present invention, the above and other objectives are realized in an apparatus and method in which a battery system is provided for a switching system load comprising one or more first rechargeable batteries, each adapted to be switched in parallel across the the switching system load and each having cells floated at a given float voltage and whose number is preselected such that the initial minimum voltage of each first battery, after the battery is brought in circuit with the load, exceeds a predetermined minimum load voltage.

With this configuration for battery system, the given float voltage for the cells of the first batteries can be selected to be the voltage found most desirable for extended battery life. Furthermore, this selection will not adversely effect the load.

In the embodiment of the invention to be disclosed hereinafter, the battery system is further provided with a means for sensing the voltage being supplied to the load from the primary supply and for switching the first batteries in parallel with the load upon the supplied voltage falling below a given value. Furthermore, in the disclosed embodiment, the number of cells of each first battery is further selected such that the voltage of each first battery is above a preselected load voltage for a given period of time, after the first batteries are switched in circuit with the load. In order to maintain the load voltage at the preselected value and not exceed a predetermined maximum load voltage, a voltage converter or regulator is interposed between the load and the first batteries to reduce the battery voltage to the preselected load voltage.

Additionally, in the disclosed embodiment, means is provided for charging the first batteries and for providing at all times in parallel with the load, a low resistance path to ground. The latter is disclosed as a second rechargeable battery having cells floated at the given float voltage, but whose number is fewer than that used in the first batteries so as not to exceed the nominal load voltage.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
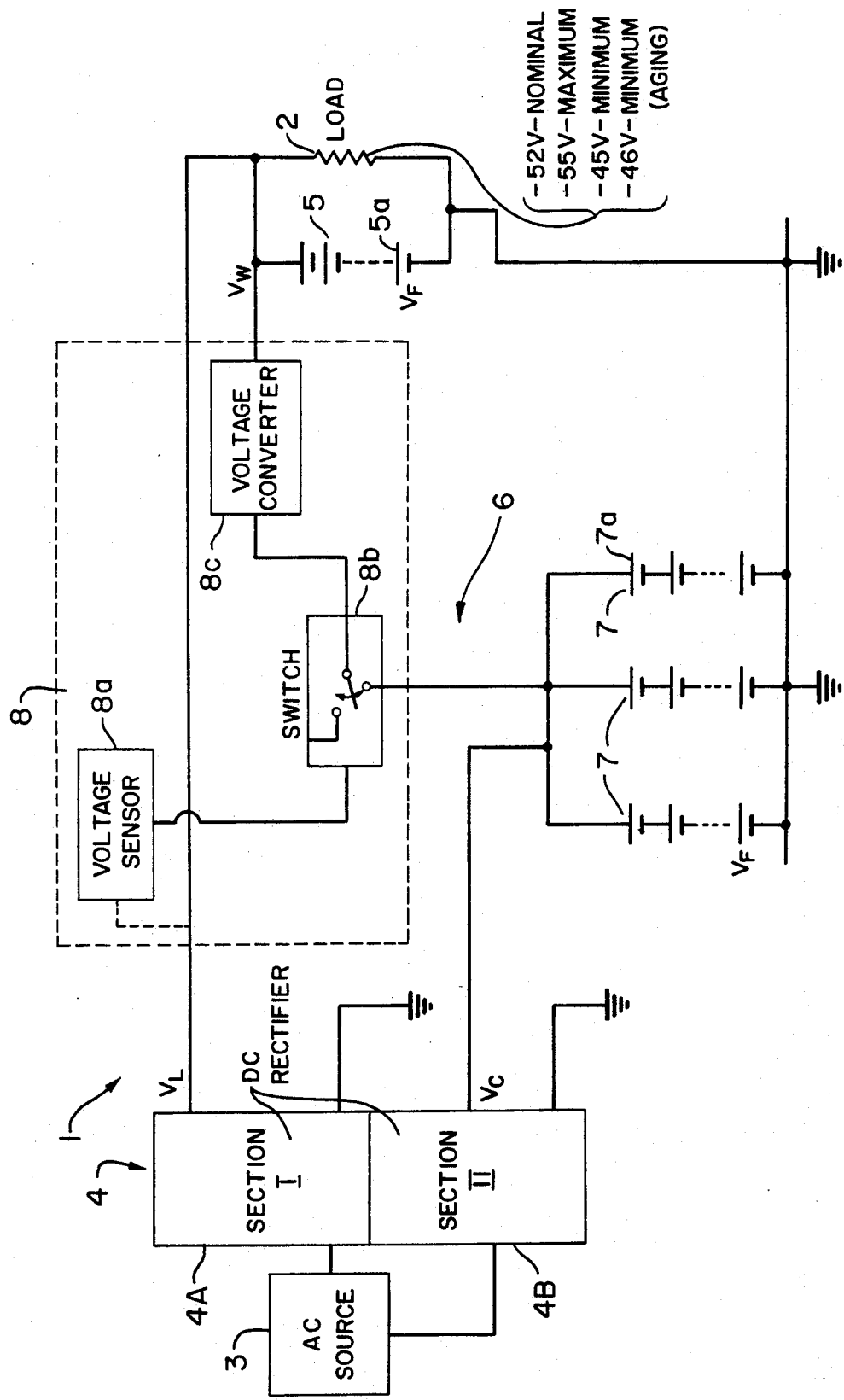
FIG. 1 illustrates a system for supplying power to a switching equipment load using a battery system in accordance with the principles of the present invention.

FIG. 1 shows a system 1 for supplying power to a switching equipment load 2 of a telephone plant. The system comprises an AC voltage source 3 (typically a commercial source of supply) whose output is coupled to standard DC rectifier 4. The rectifier 4 contains a first rectifier section 4A which is required to transform the AC voltage into a DC voltage $V_L$ for supplying the load 2. The rectifier 4 also contains a second rectifier section 4B which is used to develop a second voltage $V_C$ for use as will be hereinbelow.

The switching equipment load 2 for purposes of this example, is assumed to be a standard 1150–1200 amp load operating at a preselected or nominal negative supplied voltage $V_N$ of −52 volts. Furthermore, the load is assumed to be capable of sustaining operation below a maximum value of supplied negative voltage of −55 volts and above a minimum value of supplied negative voltage of −45 volts when initially put into service. With aging, the aforesaid minimum value of negative voltage associated with the load is expected to increase to a value of −46 volts.

The system 1 is further provided with a back-up battery system 6 designed in accordance with the principles of the present invention. The back-up battery system 6 comprises a string of like rechargeable batteries 7 which are connected in parallel and adapted to be connected in parallel with the load 2 upon failure or interruption of primary supply, i.e., failure or interruption of the AC source 3 and/or DC rectifier 4. In accord with the invention, each of the rechargeable batteries 7 includes a number of cells 7a each of which is floated at a given float voltage $V_F$ selected to achieve maximum life for the battery. Furthermore, the number of cells of each battery 7 is selected such that the minimum negative battery voltage of each battery occurring shortly after the battery is brought into operation exceeds the minimum negative voltage requirements of the load. In particular, in the present case, the negative load voltage minimum to be exceeded is that associated with an aging load, i.e., −46 volts in the illustrative case of FIG. 1.

Figure 2:
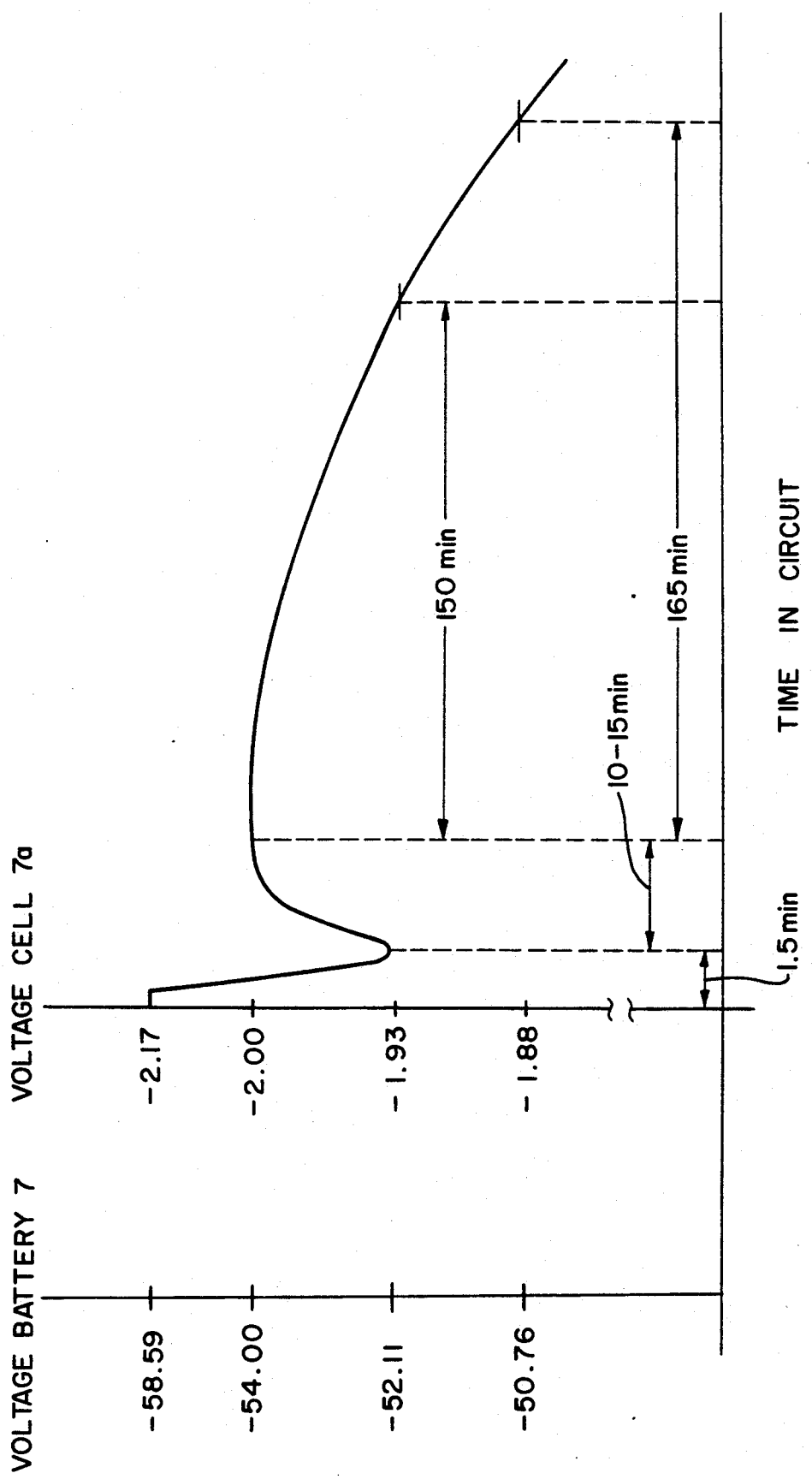
FIG. 2 shows the voltage characteristic of the rechargeable batteries and battery cells of the back-up batteries used in the system of FIG. 1.

More specifically, as an example, let it be assumed that the float voltage $V_F$ of each cell 7a is the above-discussed value of −2.17 volts and that each cell 7a has a voltage characteristic which varies with time as shown in FIG. 2. As can be seen, the cell voltage after the cell is placed in circuit or operation, initially decreases rapidly to a minimum negative voltage of −1.93 volts, then increases to a plateau negative voltage and then decreases gradually to a negative voltage of −1.88 volts over a three hour period. Accordingly, by selecting the number of cells 7a of each rechargeable battery 7 such that the initial minimum negative battery voltage (i.e., that occuring at the −1.93 volts per cell point) exceeds −46 volts, the minimum negative voltage requirement will be met. In the present case, this would require a minimum of 24 cells 7a.

As shown, the output of the rechargeable batteries 7 is connected to the load 2 via a sensor 8a, a switch 8b (shown schematically in FIG. 1 for illustrative purposes) and a voltage converter or regulator 8c all formed in a common unit 8. The sensor 8a senses the output of the rectifier 4 and makes a determination as to whether a failure or interruption in primary supply has occurred.

If a failure or interruption has occurred, the sensor 8a then signals the switch 8b to close, thus placing batteries 7 across the load thru converter 8c. The converter 8c, in turn, as long as the voltage at its input exceeds the nominal load voltage $V_N$, converts or reduces this voltage to the nominal voltage and couples it to the load 2.

When the rechargeable batteries 7 are thus connected in circuit with the load 2 via the switch 8b and converter or regulator 8c, the voltage applied to the load will be at the nominal negative load voltage $V_N$, for as long as the voltage of batteries 7 exceeds this nominal negative voltage. Accordingly, in further accord with the invention, the number of cells 7a of each battery 7 is selected not only such that the initial minimum negative voltage of each battery (i.e., that occurring at the −1.93 volts per cell point in the present example) exceeds the minimum negative load voltage (−46 volts in the present example), but also such that the battery voltage exceeds the nominal negative load voltage $V_N$ (−52 volts in the present example) over a preselected period of time. This ensures that after the rechargeable batteries 7 are brought into operation they will provide a voltage sufficient to maintain the load voltage at the nominal negative voltage value $V_N$ for the preselected period.

In the present illustrative case, in order for this to occur for about a two and one-half three hour period, the number of cells 7a for each battery 7 would be selected to be 27. With this number of cells, the negative battery voltage will exceed −52 volts until the voltage of the individual cells 7a falls to below −1.93 volts. As can be seen from FIG. 2, this occurs after approximately two and one-half hours from the time the cells are brought into operation.

As can be appreciated, when an interruption or failure in the primary supply is restored in the system 1 and the supply voltage rises to a value slightly above the output of converter 8c, the sensor 8a senses this condition. At this time, the sensor again signals the switch 8b causing the switch to disconnect the string of batteries 7 from the converter 8c input. In this way, the system is returned to its normal condition, until a further interruption or failure occurs.

As shown in FIG. 1, the batteries 7 are recharged and floated at the voltage $V_C$ output of the section 4B of the rectifier 4. The voltage $V_C$ is determined by multiplying the number of cells 27a of each battery 7 by the given or desired float voltage per cell. For the example discussed above of 27 cells at a float voltage of −2.17 volts per cell, the value $V_C$ is given as approximately −58.6 volts. This voltage for $V_C$ ensures that the batteries are maintained ready for use at all times.

In order to stabilize the primary supply (i.e., DC rectifier 4) from minor changes in the load 2, the system 1 is further adapted to include at all times across the load, a low resistance path to ground. In the illustrative case shown, this path is provided by a further rechargeable battery 5, having cells 5a each of which is also floated at the given float voltage $V_F$. The number of cells of the battery 5 is selected such that the battery is floated at the nominal negative load voltage $V_N$, thus ensuring that the battery voltage is below the maximum load voltage. In the present illustrative example of $V_N$ equal to −52 volts and $V_F$ equal to −2.17 volts, the number of cells for the battery 5 would be 24.

It should be noted that the cells 5a of the battery 5, while floated at the voltage $V_F$, can have considerably less ampere/hour capacity than the cells 7a. This is so because the battery 5 is not required to supply energy to the load 2 during interruption or failure of the primary supply. As a result, the battery 5 can be less expensive to construct than the batteries 7. If cost is not a factor, however, the cells 5a of the battery 5 can be of like construction as the cells 7a of the batteries 7.

It also should be noted that the arrangement of the batteries 7 of the back-up battery system 6 is highly efficient, since a substantial part of the capacity of each battery is now used in providing back-up power. Thus, where the aforementioned prior art 24 cell battery systems made use of only about 60% of the capacity of each battery, the present system approaches use of about 100% of the capacity of each battery.

The sensor 8a, switch 8b and voltage converter 8c may be formed as a single unit using MOS FET technology. In such case, a fail-safe contact switch might also be provided to parallel the MOS FET switch and be operated in event of its failure.

As above-indicated, the sensor 8a operates the switch 8b to bring the batteries 7 in circuit with the load upon failure or interruption of the supply 3 or rectifier 4. The particular voltage level or change in the supply voltage constituting such a failure or interruption will depend upon the requirements of each particular system 1.

The batteries 7 of the system 1 might typically be of the lead-acid type used in telecommunications equipment. A particular type battery might be a 1680 AH cell manufactured by C & D Power Systems Co.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention. Thus, while invention has been illustrated in terms of battery and load voltages which are negative, the principles of the invention are equally applicable to battery and load voltages which are positive.

What is claimed is:

1. Apparatus comprising:
    a back-up battery system for providing back-up power to a switching equipment load, said load receiving power from a primary supply at a nominal load voltage, which is between a maximum load voltage value and a minimum load voltage required so as to avoid disturbances to said load comprising:
    one or more first rechargeable batteries, each said first rechargeable battery having cells floated at a given float voltage and being of a number such that the voltage of the first rechargeable battery exceeds the minimum load voltage for a preselected period after the first rechargeable battery is switched in circuit with said load, said preselected period exceeding the period over which the first rechargeable battery reaches an initial minimum voltage, and said cells being further of a number such that the float voltage of the first rechargeable battery exceeds said maximum load voltage;
    means for sensing the voltage being supplied by said primary supply to said load for selectively switching said one or more rechargeable batteries in circuit with said load upon a given condition of said supplied voltage;
    and means for converting the voltage provided by each said one or more first rechargeable batteries to below said maximum load voltage when said first rechargeable batteries are switched in circuit with said load.

2. Apparatus in accordance with claim 1 wherein:
    said minimum load voltage is above a predetermined minimum load voltage, said predetermined minimum load voltage being preselected to be equal to an initial minimum load voltage plus an expected increase based upon aging of said load.

3. Apparatus in accordance with claim 1 wherein:
    said first rechargeable batteries are connected in parallel.

4. Apparatus in accordance with claim 1 further comprising:
    low resistance path to ground means connected across said load during supply of voltage to said load by said primary supply and by said first rechargeable batteries.

5. Apparatus in accordance with claim 4 wherein:
    said low resistance path to ground means comprises a second rechargeable battery having cells floated at said given float voltage and of a number which is less than the number of cells of each of said first rechargeable batteries.

6. Apparatus in accordance with claim 5 wherein:
    the number of cells of said second rechargeable battery is such that the float voltage of said second rechargeable battery is equal to the nominal voltage of said load.

7. Apparatus in accordance with claim 5 wherein:

said given float voltage is about −2.17 volts.

8. Apparatus in accordance with claim 7 wherein:
the number of cells of the said second rechargeable battery is 24;
and the number of cells of each of said one or more first rechargeable batteries is 27.

9. Apparatus in accordance with claim 8 wherein:
the number of first rechargeable batteries is three and said first rechargeable batteries are connected in parallel.

10. Apparatus in accordance with claim 1 wherein:
said number of cells of said first rechargeable battery results in a voltage for each of said first rechargeable batteries which exceeds said nominal voltage over said given period of time;
and said means for converting converts the voltage provided by each of said one or more first rechargeable batteries to said nominal load voltage.

11. Apparatus in accordance with claim 1 further comprising:
means for charging said one or more first rechargeable batteries at a given float voltage.

12. Apparatus in accordance with claim 11 further comprising:
said load;
and said primary supply connected to said load.

13. Apparatus in accordance with claim 12 wherein:
said primary supply comprises: an AC source of power; and a rectifier connected to said AC source of power for developing DC power.

14. Apparatus in accordance with claim 1 wherein:
said sensing and selective switching means connects said one or more rechargeable batteries in parallel with said load.

15. Apparatus in accordance with claim 1 wherein: said given float voltage is about −2.17 volts.

16. A method of providing back-up power to a switching equipment load, said load receiving power from a primary supply at a nominal load voltage, which is between a maximum load voltage and a minimum load voltage required so as to avoid disturbances to said load comprising:
providing one or more first rechargeable batteries, each said first rechargeable battery having cells floated at a given float voltage and being of a number such that the voltage of the first rechargeable battery exceeds the minimum load voltage for a preselected period after the first rechargeable battery is switched in circuit with said load, said preselected period exceeding the period over which the first rechargeable battery reaches an initial minimum voltage, and said cells being further of a number such that the float voltage of the first rechargeable battery exceeds said maximum load voltage;
sensing the voltage being supplied by said primary supply to said load for selectively switching said one or more rechargeable batteries in circuit with said load upon a given condition of said supplied voltage;
and converting the voltage provided by each said one or more first rechargeable batteries to below said maximum load voltage when said first rechargeable batteries are switched in circuit with said load.

17. A method in accordance with claim 11 wherein:
said minimum load voltage is above a predetermined minimum load voltage, said predetermined minimum load voltage being preselected to be equal to an initial minimum load voltage plus an expected increase based upon aging of said load.

18. A method in accordance with claim 16 wherein:
said first rechargeable batteries are connected in parallel.

19. A method in accordance with claim 16 further comprising:
providing a low resistance path across said load during supply of voltage to said load by said primary supply and by said first rechargeable batteries.

20. A method in accordance with claim 19 wherein:
said step of providing a low resistance path comprises connecting across said load a second rechargeable battery having cells floated at said given float voltage and of a number which is less than the number of cells of each of said first rechargeable batteries.

21. A method in accordance with claim 20 wherein:
the number of cells of said second rechargeable battery is such that the float voltage of said second rechargeable battery is equal to the nominal voltage of said load.

22. A method in accordance with claim 20 wherein:
said given float voltage is about −2.17 volts.

23. A method in accordance with claim 22 wherein:
the number of cells of the said second rechargeable battery is 24;
and the number of cells of each of said one or more first rechargeable batteries is 27.

24. A method in accordance with claim 23 wherein:
the number of first rechargeable batteries is three and said first rechargeable batteries are connected in parallel.

25. A method in accordance with claim 16 wherein:
said number of cells of said first rechargeable battery results in a voltage for each of said first rechargeable batteries which exceeds said nominal voltage over said given period of time;
and said converting step converts the voltage provided by each of said one or more first rechargeable batteries to said nominal load voltage.

26. A method in accordance with claim 16 further comprising:
charging said one or more first rechargeable batteries at a given float voltage.

27. A method in accordance with claim 16 wherein:
said sensing and selective switching step includes connecting said one or more rechargeable batteries in parallel with said load.

28. A method in accordance with claim 16 wherein:
said given float voltage is about −2.17 volts.

* * * * *